United States Patent [19]

Gerfast

[11] Patent Number: 4,625,384
[45] Date of Patent: Dec. 2, 1986

[54] METHOD OF MAKING A RECORDING DISC

[75] Inventor: Sten R. Gerfast, Mendota Heights, Minn.

[73] Assignee: Minnesota Mining and Manufacturing Company, St. Paul, Minn.

[21] Appl. No.: 655,309

[22] Filed: Sep. 26, 1984

Related U.S. Application Data

[62] Division of Ser. No. 369,905, Apr. 19, 1982, abandoned.

[51] Int. Cl.[4] .......................... B23P 11/02; G11B 5/82
[52] U.S. Cl. ........................................ 29/448; 360/135
[58] Field of Search ................... 360/133, 135; 29/448

[56] References Cited

U.S. PATENT DOCUMENTS

| | | |
|---|---|---|
| 2,662,804 | 12/1953 | Hutton . |
| 3,130,110 | 4/1964 | Schmidt . |
| 3,336,583 | 8/1967 | Comstock . |
| 3,373,413 | 3/1968 | Treseder . |
| 3,488,646 | 1/1970 | Sugaya . |
| 3,509,274 | 4/1970 | Kihara . |
| 3,537,083 | 10/1970 | Voth . |
| 3,599,226 | 8/1971 | Lips . |
| 3,668,658 | 6/1972 | Flores et al. . |
| 4,166,622 | 9/1979 | Rager .............................. 360/135 X |
| 4,407,428 | 10/1983 | Stone ................................ 229/5.5 X |

FOREIGN PATENT DOCUMENTS

| | | |
|---|---|---|
| 0030623 | 6/1981 | European Pat. Off. . |
| 2342890 | 8/1973 | Fed. Rep. of Germany . |

OTHER PUBLICATIONS

U.S. Ser. No. 283,813 filed Aug. 25, 1972 which is believed to be a translation of item "AL" above.

Primary Examiner—Howard N. Goldberg
Assistant Examiner—Steven Nichols
Attorney, Agent, or Firm—Donald M. Sell; James A. Smith; David W. Anderson

[57] ABSTRACT

A recording disc is provided by a disc-shaped, formed-sheet-metal support across which a flexible recording sheet is stretched. The formed-sheet-metal support has a central spindle opening which can be precisely centered by simultaneously punching the spindle opening and the circular periphery, thus permitting high-speed rotation of the recording disc in use.

5 Claims, 7 Drawing Figures

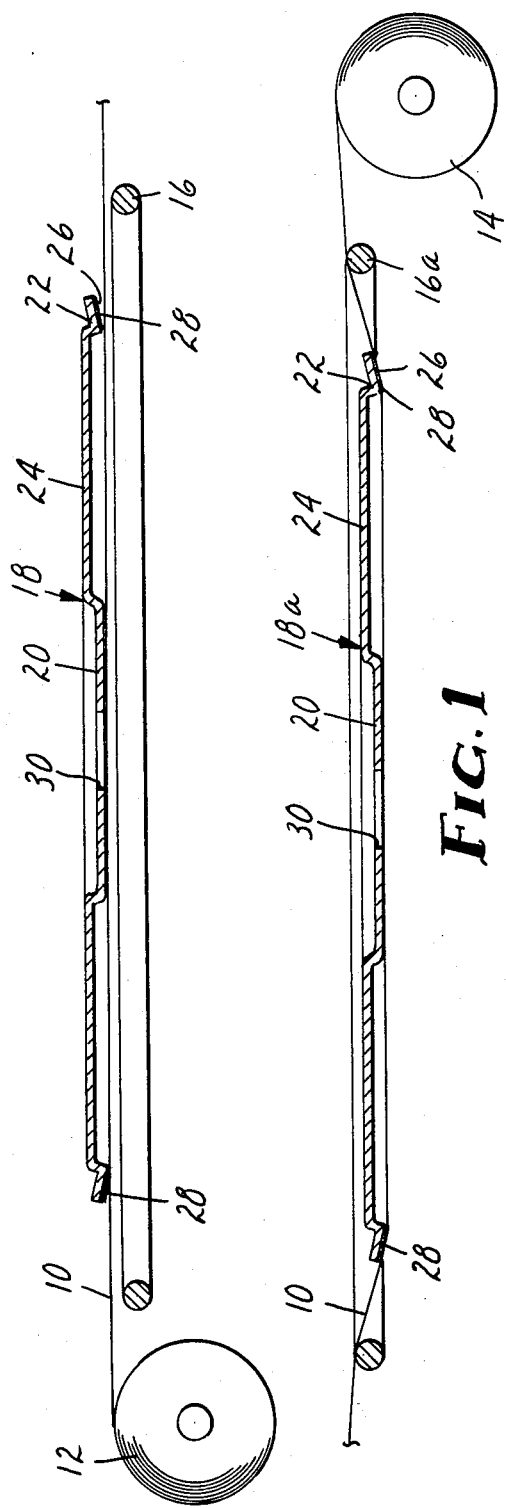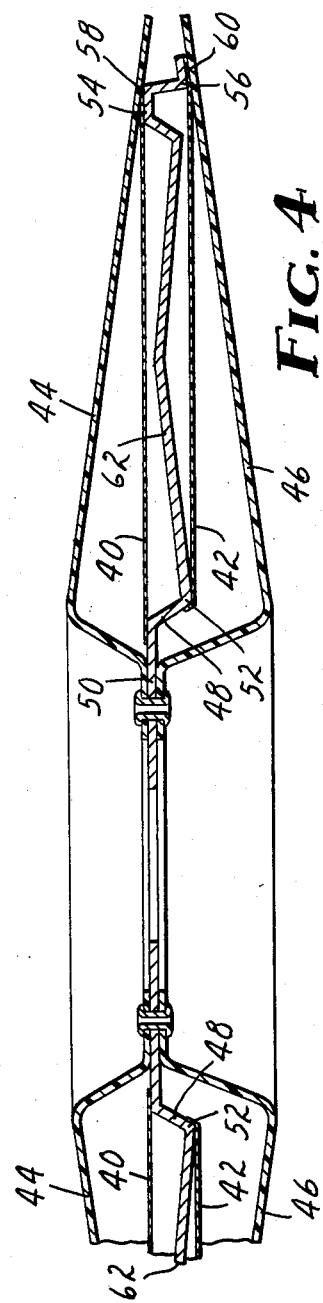

METHOD OF MAKING A RECORDING DISC

This is a division of application Ser. No. 369,905 filed Apr. 19, 1982, now abandoned.

TECHNICAL FIELD

The invention relates to a recording disc consisting of a flexible recording sheet, especially a magnetic recording sheet, stretched across a rigid, disc-shaped support to provide an annular recording area.

BACKGROUND ART

Diskettes such as illustrated in U.S. Pat. No. 3,668,658 (Flores et al.) are in widespread use, being both inexpensive and convenient to use. Before diskettes were known, a number of patents had issued concerning magnetic recording discs which consisted of a flexible magnetic recording sheet stretched across a rigid disc-shaped support to provide a drumhead-like recording medium. While the recording disc of a diskette has a plastic film backing which inevitably experiences dimensional changes with changes in temperature and humidity, the recording area of a drumhead-like recording medium has substantially the same dimensional stability as the support, and thus can have much improved dimensional stability as compared to the recording disc of a diskette. Furthermore, a recording head may press against a stretched recording sheet without a pressure pad as is required for a diskette. A pressure pad limits the rotational speed and hence reduces access times and is also a source of wear. In spite of these advantages, such drumhead-like media apparently have not been commercially successful. Cost considerations may have inhibited their commercialization.

Drumhead-like magnetic recording media are shown in U.S. Pat. Nos. 2,662,804 (Hutton); 3,130,110 (Schmidt); 3,336,583 (Comstock); 3,373,413 (Treseder); 3,488,646 (Sugaya); 3,509,274 (Kihara); 3,537,083 (Voth); 3,599,226 (Lips); and German Offenlegungsschrift No. 2,342,890 (Boissevain). Of these, Treseder and Boissevain may provide the most complete disclosure, although neither shows how to drive its recording medium. In FIG. 1 of Boissevain, a thin magnetic recording sheet is supported in tension about an upstanding rim of a support base by a tensioning hoop. Although supported only at the rim, Boissevain suggests that the recording sheet could also be supported by a hub in the center. Since no details are given concerning the construction of either the support base or the tensioning hoop or how the product is assembled, one cannot estimate the manufacturing cost, but it probably would substantially exceed that of a diskette. The recording medium of Treseder may have a lower manufacturing cost, but mechanism to drive it rotatably would probably increase the overall costs well above those of a diskette system.

European patent application No. 80107017.8, filed Nov. 14, 1980, which is based on U.S. patent application Ser. No. 102,161 filed Dec. 10, 1979, also shows a drumhead-like recording medium wherein the recording sheet has a metal foil backing. Assembly as illustrated in FIG. 4 would be exceedingly expensive.

DISCLOSURE OF INVENTION

The present invention concerns a recording disc, especially a magnetic recording disc, which offers the aforementioned technical advantages of a drumhead-like recording medium and yet can be manufactured at a cost comparable to that of an ordinary diskette. Also, it can be rotatably driven by mechanisms no more expensive than are being used with diskettes. The recording disc of the present invention is similar to that suggested in the Boissevain Offenlegungsschrift in that in each there is (a) a rigid, symmetrical disc-shaped support having axial projections at its hub and near its rim, the peaks of the projections defining an unobstructed radial plane along one face of the support;

(b) said support including a flange connecting the projections; and (c) a taut, flexible recording sheet secured to the support, which sheet contacts the peaks of the projections and is spaced from the flange.

Unlike the recording disc of Boissevain, that of the invention is characterized in that (1) its disc-shaped support is formed-sheet-metal, e.g., the product of stamping or spinning a metal sheet, and (2) the disc-shaped support has a central spindle opening.

The dimensional stability and flatness of the recording sheet depend almost exclusively upon the disc-shaped support which may be made of an alloy selected to provide rigidity and to experience very little expansion or contraction over the temperature range to be encountered in use. Aluminum alloys and steel are especially useful and also are of low cost and easy formability. If the steel is ferromagnetic, the disc-shaped support can be magnetically latched to a turntable. If it is not ferromagnetic, a ferromagnetic ring can be fastened to the disc-shaped support for latching purposes.

By punching the spindle opening and circular periphery simultaneously, the spindle opening can be precisely centered at very low cost.

To enhance its rigidity, the flange of the disc-shaped support preferably is formed to have surface discontinuities such as corrugations which preferably extend in radial directions and may also extend in other directions. The surface discontinuities may economically be created during punching. Rigidity is also enhanced if the flange is a shallow cone or cones.

As a result of being formed-sheet-metal, the disc-shaped support of the invention is inherently radiused at points of changes in direction and has uniform thickness and density throughout. For these reasons and because of the convenient precise centering of the spindle opening, the disc-shaped support is economically balanced for highspeed rotation.

Preferably, extending beyond the peak of the rim projection of the disc-shaped support is a ramp which is inclined about 3°–30° from the above-mentioned radial plane, and the recording sheet extends over the ramp and is secured to the disc-shaped support radially beyond the peak of the rim projection. The surface of the ramp may be conical or generally spherical. If the latter, only that portion of its length up to 1/10 of the radius of the disc support is taken into account in measuring its inclination from the radial direction. If the slope were less than about 3°, the ramp would poorly function as a means for stretching the recording sheet across the projections. If the slope were more than about 30°, the recording sheet would tend to bunch up on the ramp and hence interfere with the attainment of uniform tension in the unsupported area of the recording sheet.

A piece of a flexible recording sheet which is larger than the disc-shaped support can be secured to the support by holding the piece tautly, stretching it across the ramp, and then securing it either to the ramp or radially beyond the ramp while maintaining its taut condition. Preferably it is adhesively bonded to the surface of the ramp, but other adhesive and mechanical techniques for securing the recording sheet are useful, such as those mentioned below. After being permanently secured, any wrinkles in the unsupported area can be eliminated by heating to a temperature at which the recording sheet begins to shrink.

The axial hub projection may have a broad flat area, the face of which defines the aforementioned unobstructed radial plane. For simplicity and economy of manufacture, the recording sheet preferably is not adhered to but lies flat against this area. The support provided by the flat area of the hub projection to a recording sheet which is not adhered to the hub projection seems to enhance the uniformity of tension in the unsupported area of the recording sheet.

A two-sided recording disc may be provided if the formed-sheet-metal support has hub and rim projections along each face, with a taut recording sheet extending across the projections and ramps of each face and spaced from the flange.

If the disc has only one recording surface, the spindle opening is preferably punched from the opposite face. This inherently provides a slight, but desirable, rounding of the edge of the opening at said opposite face, and any burrs tend to form at the face adjacent the recording surface and thus should not interfere with a tapered spindle. If the disc has two recording surfaces, it preferably is always mounted with the same side contacting the turntable for use with recording heads at both recording surfaces. In such event, the disc-shaped support should be punched from the face to contact the turntable.

The recording sheet of the present invention may be a magnetic recording sheet as in the Boissevain Offenlegungsschrift, and its magnetizable layer and should be randomly oriented. Its backing may either be a plastic or a metal foil as in the aforementioned European patent application. A preferred backing is biaxially-oriented polyethylene terephthalate film. If secured to a disc support under moderate tension and stored at ordinary room temperature for as long as five years, it should continue to be sufficiently taut for the purposes of this invention. Even if occasionally subjected to the sort of temperature variations normally encountered in shipment, it should maintain that tautness for about five years.

The recording sheet or sheets may be optically recordable. For example, a flexible recording sheet may have a coating comprising a thermoplastic resin binder and a substance capable of absorbing energy from a pulse-encoded laser beam which records information in the form of depressions or holes surrounded by sharply defined ridges. See European patent application No. 78300865.9 filed Dec. 19, 1978 which is based on U.S. patent application Ser. No. 862,069 filed Dec. 19, 1977. The recording sheet or sheets may be recordable by electrostatic or any other means. If either the application of the coating or the recording of information involves high temperatures, it may be preferred to employ a metal or polyimide film backing.

THE DRAWING

In the drawing:

FIG. 1 is a partial schematic elevation of an automated assembly line for adhesively securing a taut, flexible recording sheet to a disc-shaped, formed-sheet-metal support to produce a recording disc of the invention;

FIG. 4 is a partial schematic central cross-section of a magnetic recording disc of the invention which is recordable at both faces;

Figure 2:
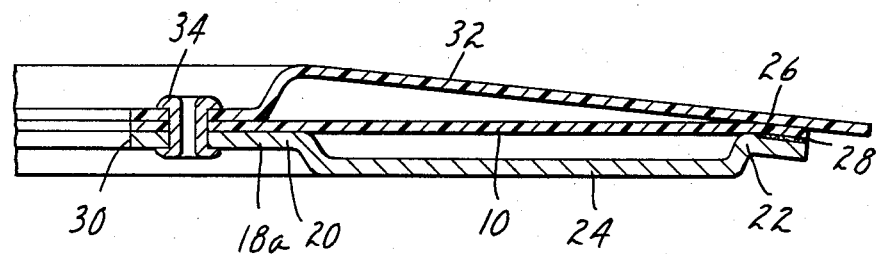
FIG. 2 is a partial schematic central cross-section of a completed magnetic recording disc made using the apparatus of FIG. 1 and having a protective cover, enlarged to show details.

In FIG. 1, a flexible recording sheet 10 is unwound from a supply roll 12 and clamped by tenter hooks (not shown) which continuously carry the sheet to a windup roll 14. The tenter hooks are adjusted to stretch the travelling sheet 10 slightly in both the longitudinal and transverse directions. Travelling with the sheet are mechanisms (not shown) for supporting identical hoop fixtures 16 and 16a and identical rigid, disc-shaped formed-sheet-metal supports 18 and 18a, all of which are shown in central section. One face of each of supports 18 and 18a has an axial hub projection 20 with a flat, annular peak and an axial rim projection 22 with a ridged peak. The peaks of the projections 20 and 22 define an unobstructed plane in the radial direction along the face of the formed-sheet-metal support adjacent to the recording sheet 10. A flange 24 connecting said projections lies generally parallel to said plane. The flange 24 and projections 20 and 22 together form an annular recess in said one face of each formed-sheet-metal support.

Extending beyond the peak of the rim projection 22 is a conical ramp 26. A fast-curing adhesive 28 has been applied to the ramp.

The support 18a, while travelling with the recording sheet 10, has been moved so that the portion of the sheet within the hoop fixture 16a has been further stretched over the ramp 26 to a modest extent. Heat applied (as by infrared lamps or an oven, not shown) cures the adhesive 28 and also makes the recording sheet 10 more taut. The recording sheet 10 is then cut at the radially-outer edge of the ramp and at a spindle opening 30, each of the support 18a and hoop fixture 16a is retracted, and the residue of the sheet 10 is wound up in a roll 14 as scrap. Upon being retracted, the formed-sheet-metal support 18a is released and its associated travelling mechanism is returned to carry another disc-shaped support along the sheet 10 for assembly.

Instead of travelling with the sheet, one or more hoop fixtures 16 and 16a may have fixed positions, with the sheet 10 being periodically advanced.

After the support 18a with the adhered recording sheet has been removed from the assembly line of FIG. 1, any wrinkles in the unsupported area of the recording sheet 10 can be removed by blowing heated air if the backing of the sheet 10 is a plastic film. Although the sheet 10 may also be adhesively or otherwise secured to the face of the hub projection 20, it preferably is not.

The recording disc produced on the assembly line of FIG. 1 may be furnished with a circular protective cover 32 that rotates with the disc. As seen in FIG. 2, the protective cover may be a shape-sustaining metal or plastic foil which is fastened to the hub of the formed-sheet-metal support 18a by three symmetrically positioned eyelets 34, and is bistable between normal and inverted shapes. When in the normal shape as shown in FIG. 2, the cover contacts the entire periphery of the support 18a to provide a substantially dust-tight enclosure. When the cover 32 is lifted to assume the inverted shape shown in FIG. 3, there is free access to the exposed surface of the recording sheet 10 from the entire periphery of the disc.

The magnetic recording disc of the invention shown in FIG. 4 has two taut, flexible recording sheets 40 and 42 and two protective covers 44 and 46 on both sides of a rigid, disc-shaped formed-sheet-metal support 48. The support 48 has a broad, flat axial projection 50 at one face and a narrow ridge-shaped axial hub projection 52 at its other face. Near its rim are axial ridge-shaped projections 54 and 56, and extending beyond their peaks are shallow, conical ramps 58 and 60, respectively. The center of a flange 62 between the projections has a circular fold to enhance rigidity.

Figure 3:
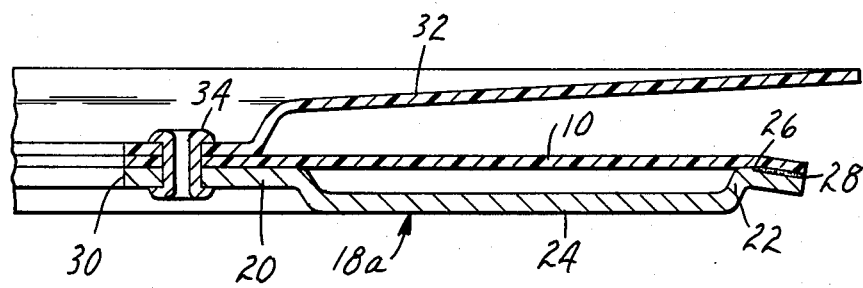
FIG. 3 is a partial schematic central cross-section of the recording disc of FIG. 2 with its cover in the open position.
Figure 5:
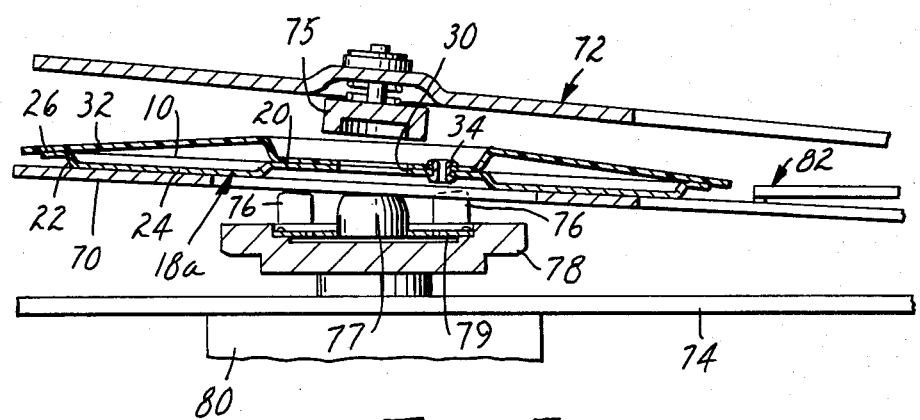
FIG. 5 is a schematic cross-section elevation in a vertical plane centrally through a disc drive into which the cartridge of FIGS. 2 and 3 has been loaded.
Figure 6:
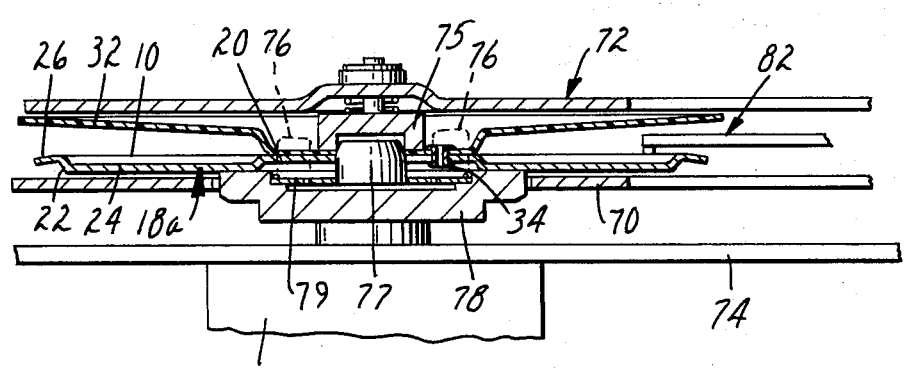
FIG. 6 shows the disc drive of FIG. 5 wherein the cartridge has been moved into operative position.

Referring to FIG. 5, the cartridge illustrated in FIGS. 2 and 3 has been slidably inserted onto a sloped platform 70 of a framework 72 which is hingedly supported from a deck 74 (hinging not shown). When the framework 72 is pivoted downwardly toward the position shown in FIGS. 6 and 7, a collet 75, which is rotatably journalled in the framework 72, contacts the cover 32 at the hub of the formed-sheet-metal support 18a and presses the inner surface of the periphery of the cover against four ears 76, thus lifting the cover off the periphery of the recording disc until the cover snaps to its inverted shape. The collet 75 continues to move the support 18a downwardly until its spindle opening 30 fits tightly over a tapered spindle 77 which is mounted on a cleft disc shaped spring 79 to move axially against the bias of the spring until the support 18a fits tightly against a turntable 78. The turntable 78 is driven by a coaxial motor 80 and with it the collet 75 and the entire cartridge. A magnetic head positioning assembly 82 is slidably mounted from the deck 74 (mounting not shown) to move from the retracted position of FIG. 4 into the operative position of FIGS. 5 and 6.

Figure 7:
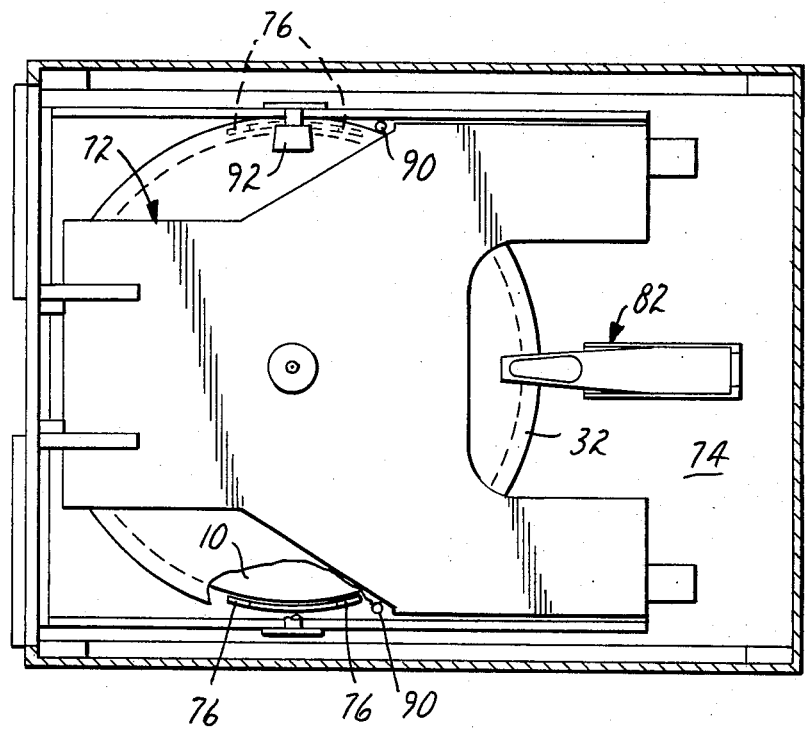
FIG. 7 is a schematic top view of the disc drive of FIGS. 5 and 6 in the operative position.

As seen in FIG. 7, when the cartridge is slidably inserted onto the sloped platform 70, a pair of stops 90 position it so that its spindle opening 30 is directly above the spindle 77.

To remove the cartridge, the head assembly 82 is retracted, and the framework 72 is pivoted upwardly toward the position of FIG. 5. The outer surface of the periphery of the cover 32 contacts a pair of rollers 92 (FIG. 7) and snaps back to its normal shape, thus closing the cartridge.

EXAMPLE 1

A sheet of 1010 cold-rolled steel, 1 mm in thickness, was cut to provide a disc 12.5 cm in diameter which was then formed to the shape of the formed-sheet-metal support 18 of FIG. 1. Its annular recess had a radial width of approximately 4 cm and a depth of approximately 2 mm.

Used as the recording sheet was magnetic recording tape having a backing of biaxially-oriented polyethylene terephthalate film 0.025 mm in thickness carrying a 1.2-micrometer coating of randomly oriented acicular gamma-$Fe_2O_3$ particles in an organic binder. While a piece of the recording tape was held flat, but not under tension, by a hoop-shaped fixture of about 18-cm diameter, a room-temperature-curing epoxy adhesive was applied to the ramp. The disc support was pressed against the recording tape to stretch the tape across its ramp. The pressure was maintained until the adhesive had cured. The film was trimmed to the outside diameter of the formed-sheet-metal support and to the diameter of its spindle opening to provide a recording disc of the invention.

The tautness of the film was measured using a probe having a spherical tip having a radius of about 3 mm which deflected the film 0.125 mm. A strain gauge on the probe indicated film penetration stiffness. Readings were taken at ordinary room temperature at three sets of three points 120° from each other. Each set included the center of the unsupported area, a point 2.5 mm from the outer periphery of the unsupported area and a point 1.25 mm from the inner periphery of the unsupported area. On the average, 4.3 grams of force was required for 0.1 mm of penetration. The minimum of the nine points was 3.9 and the maximum was 4.6. This penetration stiffness should be suitable to afford a useful storage life of about five years.

The recording disc was placed on a drive, and two circular tracks were recorded at ordinary room temperature at widths of about 50 micrometers on centers spaced 50 micrometers apart. Then a 55-micrometer path was erased between those tracks. Using the recording head, the erased track was played back at 95% R.H. and 40° C. for three hours at which time no signal was being read from either track. The absence of any playback signal indicated that the tracks were still circular.

I claim:

1. Method of making a recording disc comprising the steps of:

(1) forming sheet metal into a disc-shaped support having a substantially uniform cross-sectional thickness throughout and axial projections at its hub and near its rim, the peaks of which define an unobstructed radial plane along one face of the support and a flange connecting said projections, (2) punching a central spindle opening into the disc-shaped support, (3) stretching a recording sheet across the projections, and (4) securing the recording sheet to the disc-shaped support radially beyond the peak of the rim-projection.

2. Method as defined in claim 1 wherein step (2) involves simultaneously punching the central spindle opening and the periphery of the support.

3. Method as defined in claim 2 wherein step (1) involves forming the support to provide beyond the peak of the rim projection a ramp which is inclined about 3°-30° from the radial direction.

4. Method as defined in claim 1, wherein step (1) involves forming the sheet metal to provide axial hub and rim projections on each face of the support, and step (3) involves stretching a recording sheet across the projections on each face.

5. Method as defined in claim 1 wherein step (1) involves forming the support to provide beyond the peak of the rim projection a ramp which is inclined about 3-30 degrees from the radial direction.

* * * * *